J. LOWE.
Plow-Fender.
No. 69,352.                                                               Patented Oct. 1, 1867.
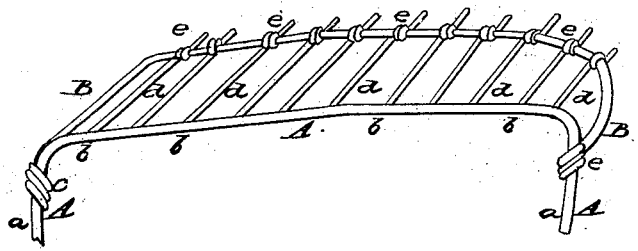
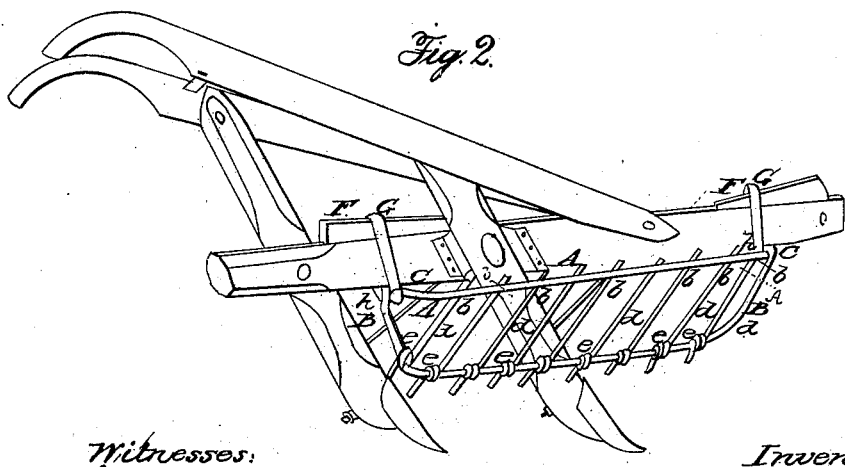

UNITED STATES PATENT OFFICE.

JOHN LOWE, OF LEBANON, INDIANA.

IMPROVEMENT IN CLOD-FENDERS.

Specification forming part of Letters Patent No. 69,352, dated October 1, 1867.

*To all whom it may concern:*

Be it known that I, JOHN LOWE, of the town of Lebanon, county of Boone and State of Indiana, have invented a new and useful Clod-Fender; and I do declare that the following is a full and exact description thereof, reference being had to the accompanying drawings, and to letters and figures of reference marked thereon.

The nature of the invention consists in the peculiar mode of construction and use of the said device, said device to be made of iron, brass, or any other fit material.

To enable others skilled in the art to make and use my said invention, I proceed to describe it more fully as follows:

Figure 1 of the accompanying drawings represents a perspective view of the device.

$d\ d\ d$ are parallel bars of metal, held in their places by being wound around the bar B at $e\ e\ e$ and let into the bar A at $b\ b\ b$. Said A and B are fastened together by the bar B being wound round the bar A at C and C, and bent in manner and form as represented by $a$ and B of Figs. 1 and 2 of the accompanying drawings. This device is attached to a common shovel-plow or cultivator as follows: Two hooks (represented by G of Fig. 3 of the accompanying drawings) are set each at a convenient place on the beam of the plow, as represented by G and G of said Fig. 2. The two ends $a$ and $a$ of the bar A are run through the hooks $h$ and $h$ under the beam of the plow. Between the top of the plow-beam and the said G is driven a wedge (represented by F of Fig. 4 of the accompanying drawings) in the manner represented by F F of said Fig. 2. The bar B is wound round the bar A at C in manner and form as aforesaid, and, holding by its friction, can be slipped along the bend of A at C. In this way the lower ends of the bars $d\ d\ d$ may be adjusted so as to be nearer or farther away from the plow, as convenience may require.

To use the said device for cultivating corn, potatoes, and other vegetables, it is fastened on the plow on the side next to the hills in manner and form as aforesaid, and properly adjusted so, as aforesaid. The plow is then run as near to the hills as it can come without tangling the tops of the vegetables in the bars $d\ d\ d$. Then all the large clods thrown up by the plow will be caught by the fender and thrown off from the hills by its motion. The fine earth will pass freely through the fender, and so cover up grass and small weeds, thereby making a great saving of time and labor.

What I claim, and desire to secure by Letters Patent, is—

The device herein described, when the same is constructed in its said several parts in manner and form as aforesaid and used for the purpose and in the manner and form substantially as set forth.

JOHN LOWE.

Attest:
 JOHN R. CRIGLE,
 JOHN H. HENDRICKS.